United States Patent [19]

Honda et al.

[11] 4,306,730
[45] Dec. 22, 1981

[54] PISTON RING FOR INTERNAL COMBUSTION ENGINE

[75] Inventors: Shoichi Honda; Yusuke Gotoda, both of Tokyo, Japan

[73] Assignee: Honda Giken Kogyo Kabushiki Kaisha, Tokyo, Japan

[21] Appl. No.: 153,020

[22] Filed: May 27, 1980

[30] Foreign Application Priority Data

Jun. 20, 1979 [JP] Japan .................... 54/84623[U]

[51] Int. Cl.³ ............... F16J 9/00; F16J 15/9; F02F 3/00
[52] U.S. Cl. ........................ 277/217; 92/177
[58] Field of Search ............ 277/216, 217; 92/177

[56] References Cited

U.S. PATENT DOCUMENTS

| | | | |
|---|---|---|---|
| 1,749,894 | 3/1930 | Stanfield | 277/217 |
| 2,302,970 | 11/1942 | Melrose | 277/217 |
| 2,766,085 | 10/1956 | Möller | 277/217 |
| 4,198,065 | 4/1980 | Fukui | 277/217 |
| 4,256,067 | 3/1981 | Fukui | 92/177 |
| 4,266,787 | 5/1981 | Fukui | 277/217 |

FOREIGN PATENT DOCUMENTS 2925779  3/1980  Fed. Rep. of Germany ...... 277/217

*Primary Examiner*—Robert I. Smith
*Attorney, Agent, or Firm*—Lyon & Lyon

[57] ABSTRACT

A piston ring for an oblong piston reciprocating in an oblong cylinder has side portions which merge at one end with a relatively long convex portion. Each side portion also merges with a relatively short convex end portion, respectively. The short convex end portions define a gap between them. Upon installation of the piston ring into a groove on the piston and within the wall of the oblong cylinder, the width of the gap is substantially reduced, thereby to stress the side portions and cause them to reduce pressure variations between the piston ring and the cylinder wall around the periphery of the piston ring. The oblong piston and cylinder may have straight side walls merging with arcuate end walls, or may be substantially elliptical in cross section.

5 Claims, 5 Drawing Figures

PISTON RING FOR INTERNAL COMBUSTION ENGINE

This invention relates to internal combustion piston engines and is particularly directed to improvements in piston rings for engines having oblong pistons and cylinders. Thus the cylinder bore and piston cross section may be of elongated circular shape, or of elliptical shape. This invention concerns a piston ring for use with such pistons and cylinders in which variation of sealing pressure between the piston ring and the cylinder wall are reduced. The shape of the piston ring in its free state before installation is chosen so that when installed within the piston groove and within the oblong cylinder wall the change in shape of the piston ring serves to produce virtually uniform sealing pressure around the periphery of the piston ring. This is true whether or not an expander is placed in the piston groove behind the piston ring.

Other and more detailed objects and advantages will appear hereinafter.

Figure 1:
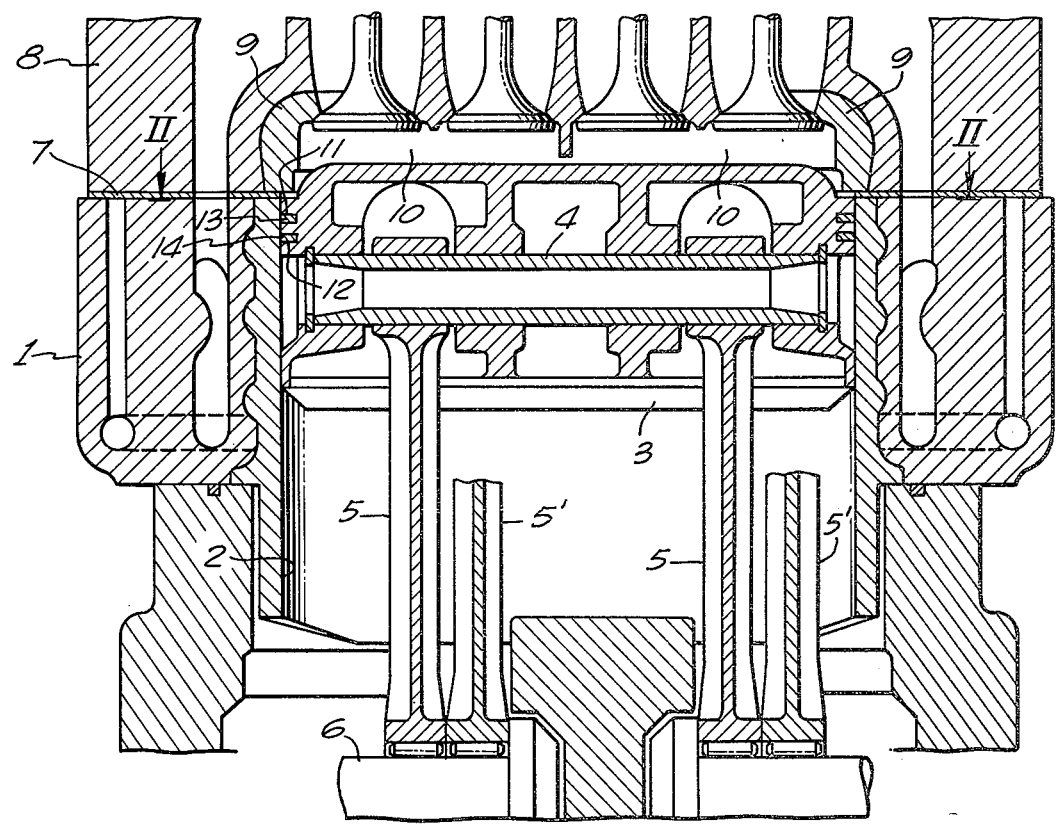
FIG. 1 is a sectional elevational showing a preferred embodiment of this invention.
Figure 2:
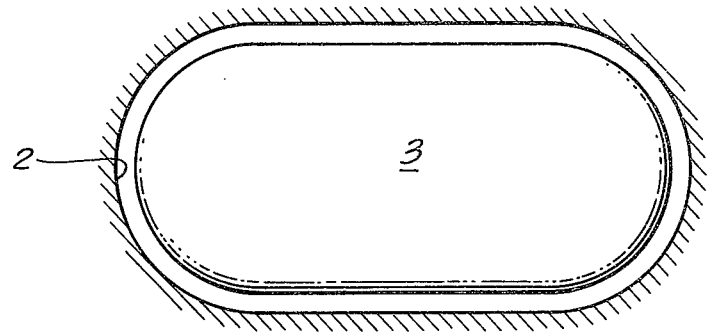
FIG. 2 is a transverse sectional detail taken substantially on the lines II—II as shown on FIG. 1.

Referring to the drawings, the internal combustion engine has a cylinder block 1 provided with a cylinder wall 2 having a transverse cross section of elongated circular shape. A piston 3 of the same shape reciprocates within the cylinder wall 2. A piston pin 4 connects the two connecting rods 5 to the engine crankshaft 6. Additional connecting rods 5' connect the crankshaft 6 to another piston, not shown. A gasket 7 is interposed between the cylinder block 1 and the cylinder head 8. A combustion chamber wall 9 provided on the bottom of the cylinder head 8 cooperates with the top surface of the piston 3 to form a combustion chamber 10. On the periphery of the piston 3 a piston ring groove 11 and an oil ring groove 12 are provided for reception of the piston ring 13 and the oil ring 14, respectively.

Figure 3:
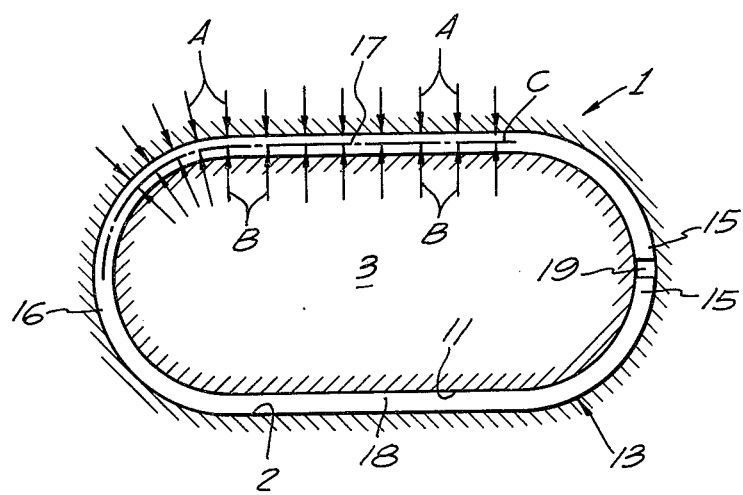
FIG. 3 is a schematic diagram showing the piston ring after installation, showing forces exerted on the cylinder wall of the piston ring.

As shown in FIG. 3, the piston ring 13 is installed in place in the groove 11 and within the cylinder wall 2. As thus installed, the two side portions 17 and 18 are straight and merge with the arcuate ends 16. Each straight portion also merges with a short arcuate portion 15. A gap 19 is defined between the ends of the short arcuate portions 15. Each of the arrows A represents pressure applied uniformly to the periphery of the piston ring 13 in order to deform the piston ring from its free state before installation, as shown by solid lines in FIG. 4, to the operating position as shown in FIG. 3. Each of the arrows B represents stress produced by such pressure. The arrows A and B are in reality distributed over the entire length of the piston ring 13.

Figure 4:
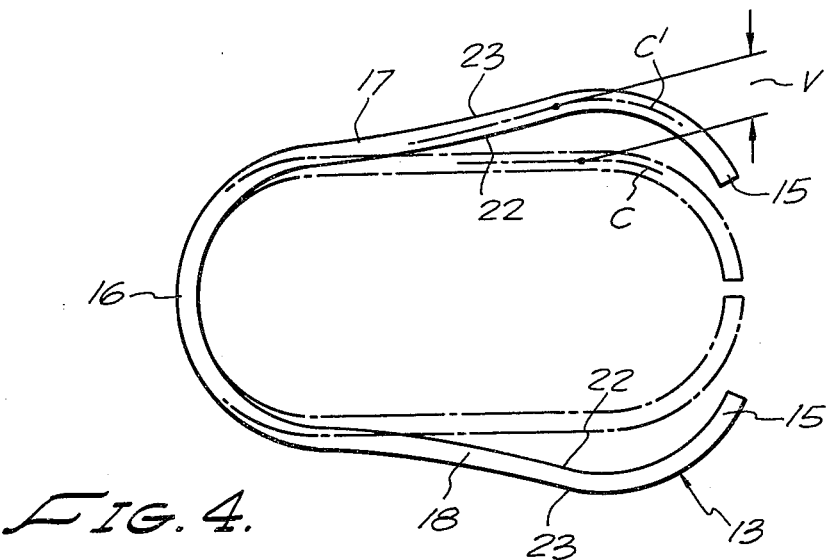
FIG. 4 shows the free shape of the piston ring in full lines prior to installation, and in phantom lines after installation.

In the free state of the piston ring 13 prior to installation, as shown by the solid lines in FIG. 4, the side portions 17 and 18 are concave. The contours of the inner surface 22 and the outer surface 23 of the piston ring 13 are fixed after the centerline C' has been determined empirically. This is accomplished by meeting specified uniform pressure standards for reducing blow-by and lubricating oil loss. The dimension V represents the amount of elastic deformation of each of the side portions 17 and 18, and the required magnitude of this dimension V is calculated by use of the theory of deformation of curved beams, in the field of strength of materials.

Figure 5:
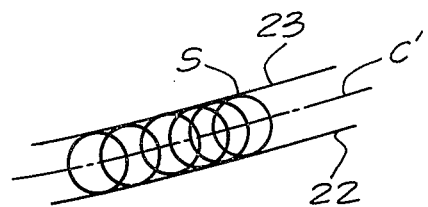
FIG. 5 is a schematic diagram showing the method of determining the contours of the inner and outer surfaces of the piston ring once the desired centerline is known.

As shown in FIG. 5, determination of the contours of the inside and outside surfaces 22 and 23 of the piston ring is accomplished by laying out a group of circles S moving on the centerline C'.

The foregoing description relates to a piston ring which has the shape of an elongated circle after installation. However, the same principles apply to a piston ring which is substantially elliptical in its installed position. In such case, the side portions as well as the end portions are convex after installation.

From the foregoing description it will be understood that when the piston ring, either in the form of an elongated circle, or substantially in the form of an ellipse, is deformed from its free state by installation into the piston groove and cylinder wall, the internal stresses set up in the piston ring tend to equalize the pressure between the piston ring and the cylinder wall around the perimeter of the piston ring.

Having fully described our invention, it is to be understood that we are not to be limited to the details herein set forth but that our invention is of the full scope of the appended claims.

We claim:

1. For use in an internal combustion engine having an oblong piston mounted to reciprocate within an oblong cylinder wall, the piston having a peripheral groove, the improvement comprising: a piston ring adapted to be received within the peripheral groove on the piston, the piston ring in its free state before installation having side portions of equal length and each having one end merging with a relatively longer convex arcuate portion, the other ends of said side portions merging with first and second relatively shorter convex arcuate portions, said shorter arcuate portions defining between them a gap, the width of the gap being substantially reduced when the piston ring is installed within the groove and within the oblong cylinder wall, the change in shape of the piston ring at installation serving to stress the side portions of the piston ring and thereby reduce differences in pressure against the cylinder wall along the periphery of the piston ring.

2. The piston ring of claim 1 in which said side portions are concave prior to installation and substantially straight thereafter.

3. The piston ring of claim 1 in which the cross sections of the piston and cylinder are substantially elliptical.

4. For use in an internal combustion engine having an oblong piston mounted to reciprocate within an oblong cylinder, the cylinder being defined within a cylinder wall having arcuate end portions and straight side portions, and the piston having a peripheral groove, the improvement comprising: a piston ring adapted to be received within the peripheral groove on the piston, the piston ring in its free state before installation having concave side portions of equal length and each having one end merging with a relatively longer convex arcuate portion, the other ends of said side portions merging with first and second relatively shorter convex arcuate portions, said shorter arcuate portions defining between them a gap, the width of the gap being substantially reduced when the piston ring is installed within the groove and within the oblong cylinder wall, the change in shape of the piston ring at installation serving to reduce the curvature of said side portions and thereby reduce differences in pressure against the cylinder wall along the periphery of the piston ring.

5. For use in an internal combustion engine having a substantially elliptical piston mounted to reciprocate within a substantially elliptical cylinder, the cylinder being defined within a cylinder wall, the piston having a peripheral groove, the improvement comprising: a piston ring adapted to be received within the peripheral groove on the piston, the piston ring in its free state before installation having side portions of equal length and each having one end merging with a relatively longer convex arcuate portion, the other ends of said side portions merging with first and second relatively shorter convex arcuate portions, said shorter arcuate portions defining between them a gap, the width of the gap being substantially reduced when the piston ring is installed within the groove and within the cylinder wall, the change in shape of the piston ring at installation serving to change the curvature of said side portions and thereby reduce differences in pressure against the cylinder wall along the periphery of the piston ring.

* * * * *